United States Patent [19]

Gill

[11] Patent Number: 4,610,454
[45] Date of Patent: Sep. 9, 1986

[54] SHOPPING CART

[76] Inventor: William H. Gill, Rte. 179, Lambertville, N.J. 08530

[21] Appl. No.: 716,435

[22] Filed: Mar. 27, 1985

[51] Int. Cl.⁴ .............................................. B62D 3/00
[52] U.S. Cl. .............................. 280/33.99 A; 182/15; 280/163
[58] Field of Search .............................. 182/15, 17, 91; 280/33.99 A, 33.99 H, 163, 164 R

[56] References Cited

U.S. PATENT DOCUMENTS

| | | | |
|---|---|---|---|
| 1,213,251 | 1/1917 | Pierce | 280/47.35 |
| 1,533,837 | 4/1925 | Douglas | 280/87.04 R |
| 2,443,236 | 6/1948 | Gallagher | 280/50 |
| 2,507,095 | 5/1950 | Cunningham | 280/166 |
| 2,632,591 | 3/1953 | Loomis | 280/163 X |
| 2,657,936 | 11/1953 | Fabel | 280/34 |
| 2,797,102 | 6/1957 | Adams | 280/30 |
| 2,807,476 | 9/1957 | Newell | 182/91 X |
| 2,890,058 | 6/1959 | Cauthon | 280/33.99 |
| 3,353,836 | 11/1967 | Davis | 280/33.99 |
| 3,834,726 | 9/1974 | Hobza | 280/33.99 A X |
| 4,096,920 | 6/1978 | Heyn | 180/11 |
| 4,431,080 | 2/1984 | Everhart | 182/15 |
| 4,462,485 | 7/1984 | Terry et al. | 182/91 X |

Primary Examiner—John J. Love
Assistant Examiner—Michael Mar
Attorney, Agent, or Firm—Sperry, Zoda & Kane

[57] ABSTRACT

An improvement in the form of an attachment to a conventional shopping cart comprises a platform to which is secured a pivot bar, the length of which is proportioned to extend beyond the ends of the platform in a position to be pivotally connected to transversely spaced frame members of the cart. The platform is secured to the top portion a frame in the form of transversely spaced, identically formed, metal loops, having reinforcing or bracing bars extending therebetween. The attachment, in one extreme position to which it is pivotally swingable, becomes wholly recessed within the space beneath the basket of the shopping cart, while in another extreme position, the platform is disposed horizontally and is extended rearwardly from the shopping cart, thus to provide a step on which one can stand to reach articles on higher shelves. When one stands upon the step, the frame secured to the underside of the platform has portions that are disposed as treads engageable against the floor surface, and binding frictionally against the surface in a manner to assure not only a stable step attachment for the user, but also to provide a brake that will prevent movement of the cart while one is using the step attachment.

1 Claim, 5 Drawing Figures

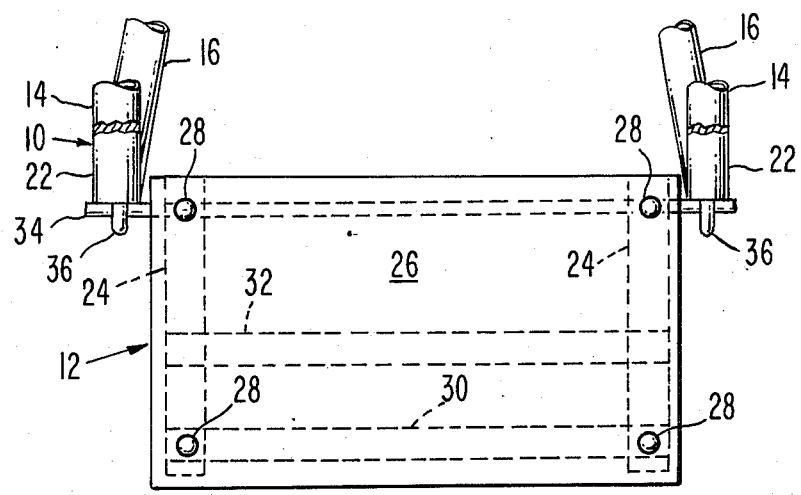
Fig_4
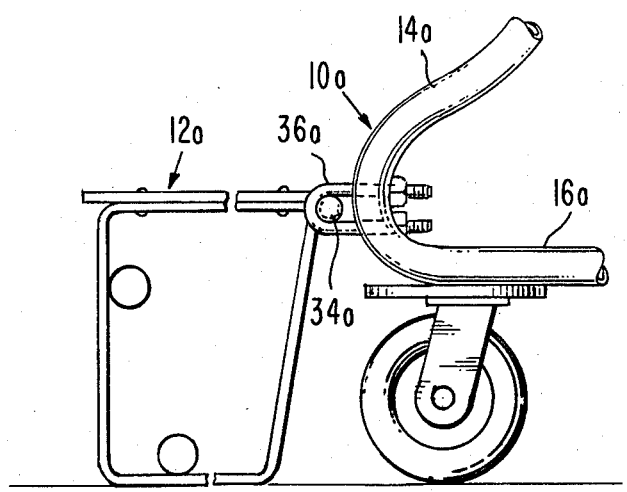
Fig_5

SHOPPING CART

BACKGROUND OF THE INVENTION

1. Field of the Invention

The invention relates generally to shopping carts and in particular to attachments therefor. In yet a more particular sense, the invention comprises devices that are attachable to conventional shopping carts without requirement of making any changes in the shopping carts, thus permitting the attachment to be secured to a shopping cart that is already in use. The attachment falls in the category of those that are movable in respect to the shopping cart, between retracted, non-use positions, and use positions in which the attachments project outwardly from the shopping cart, to present an elevated platform on which one may stand to reach articles on higher shelves of the supermarket or other establishment in which the shopping cart is being used.

2. Description of the Prior Art

Heretofore, it has been proposed to provide attachments to wheeled carts or similar vehicles. Such attachments have been provided for various purposes, and in some instances, attachments have been provided for the purpose of affording a platform on which one may stand to reach areas that are too high for a person of average height standing on the floor. In the prior art devices, however, there has been no suggestion for an attachment which can be made separately and distinctly from a grocery shopping cart of modern day design, with the attachment being so designed to be swiftly and easily attachable to or detachable from a shopping cart, without requirement of the expenditure of an excessive amount of time or labor.

Further, in the prior art, it has not been previously suggested, so far as is known, that the shopping cart attachment be so designed as to not interfere in any way with the adaptability of the shopping cart to be nested with other shopping carts when not in use. This is a very important requirement so far as grocery shopping carts are concerned, since any attachment that would interfere with the nesting procedure would be incapable of commercial use to any degree. Shopping carts must be stored in relatively small areas when not in use, and to this end are especially designed to nest almost completely, to occupy a minimum amount of space when a complete, extended line of similar carts are awaiting use in a store area adjacent to the entrance.

The present invention has been particularly designed to obviate the difficulties noted with respect to the prior art devices. To this end, the invention has an adaptability for folding to a position in which it will not interfere with nesting of the carts in any way, while at the same time the invention is adapted to be swiftly and easily connected to or detached from shopping carts of conventional manufacture that are already in use, thus permitting the device to be purchased as a separate item from the company operating the supermarket, and attached to shopping carts that have already been placed in use in the supermarket.

At the same time, the invention has as an important object the provision of a step attachment of the type described previously herein, which is swiftly operable to a use position, in which it will project outwardly from the shopping cart so as to be usable by anyone desiring to reach an article shelf.

SUMMARY OF THE INVENTION

Summarized briefly, the present invention comprises an attachment which is capable of manufacture separately from a shopping cart to which it is to be eventually connected. The attachment is so designed as to be connectable to a shopping cart of completely conventional manufacture, without detracting in any way from the capability of the shopping cart to be nested or telescoped with other, identical carts when not in actual use. To this end, the invention comprises a platform having along its front edge a transversely extending pivot bar, the ends of which project outwardly beyond the opposite ends or side edges of the platform, so as to be disposed in crossing relation to transversely spaced frame members of the shopping cart. Through the provision of clevises or connecting loops, the projecting ends of the pivot bar are connectable to the frame members of the shopping cart, without requirement of using any tools other than pliers or an inexpensive wrench, after formation of openings in the frame members for receiving the connecting loops.

Secured to the underside of the platform are identically formed, transversely spaced, metal loops, each of which have a bottom portion that is parallel to the plane of the platform. The metal loops are secured fixedly to the platform, and are also connected together by strong, parallel reinforcing bars. The metal loops, when the attachment is swung to a use position, frictionally engage their bottom portions or treads against the floor surface, thus providing a brake for the shopping cart, so that it will not move when one is using the step attachment. The platform, the loops thereof, and the reinforcing means for the loops, are all disposed in an area that will permit the entire device to be pivoted upwardly into the space below the rear portion of the basket area of the shopping cart. The entire device is so designed so as to present no interference with conventional nesting or telescoping of the shopping cart into a similar shopping cart.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 4 is a top plan view of the step attachment in its operative position, as seen from line 4—4 of FIG. 2; and FIG. 5 is a side elevational view of a modified form of attachment as used on a different type of grocery shopping cart, the cart being shown fragmentarily and in side elevation.

DESCRIPTION OF THE PREFERRED EMBODIMENTS

Figure 1:
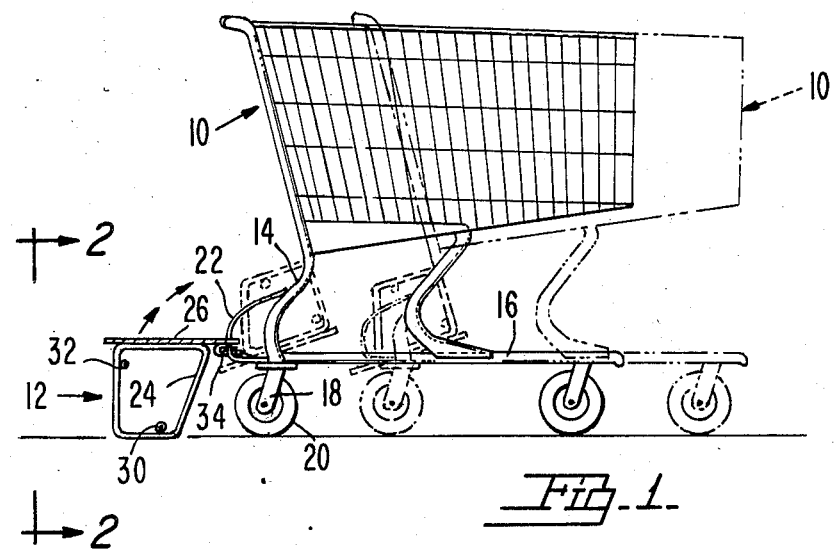
FIG. 1 is a side elevational view of a shopping cart of conventional design, to which is attached a step attachment constructed according to the present invention, the step attachment being shown in full lines in a use position and in dotted lines in a recessed position, said cart being shown in nested relation with a second cart shown in dotted lines and also having a step attachment formed according to the present invention.

Referring to FIG. 1, the reference numeral 10 designates a wholly conventional grocery shopping cart, having the usual basket mounted upon a tubular, wheeled frame, said frame including transversely spaced rear frame members 14 rigidly secured to horizontally disposed side rails 16 to which are connected swivelled rear wheel yokes 18 carrying rear wheels 20. In the shopping cart shown in FIGS. 1-4, there is also provided, on each rear side frame member 14, a curved, rearwardly projecting bumper 22, formed of a length of metal fixedly secured at its opposite ends to its associated rear side frame member 14.

A grocery cart of the type shown in FIG. 1 is adapted to nest within a second cart shown, by way of example, in FIG. 1 in dash-dotted outline.

The device comprising the present invention has been generally designated 12, and is in the form of a self-contained pre-assembled step attachment, which can be made and sold separately from the carts 10. Thus, the step attachment can be purchased by the proprietors of a supermarket, as attachments for a fleet of shopping carts that are already in use in the store.

The step attachment constructed according to the present invention may thus comprise a pair of identically formed, transversely spaced, vertically disposed, trapezoidal platform support frame elements 24. Each of these is in the form of a continuous, rigid, metal loop, although in some instances it will not be necessary that the loop be continuous. Instead, each frame element 24 could very possibly comprise a single length of strap metal, bent approximately to a U shape and having flanged ends secured fixedly to and underlying the flat, rectangular platform 26 also incorporated in the invention.

Figure 2:
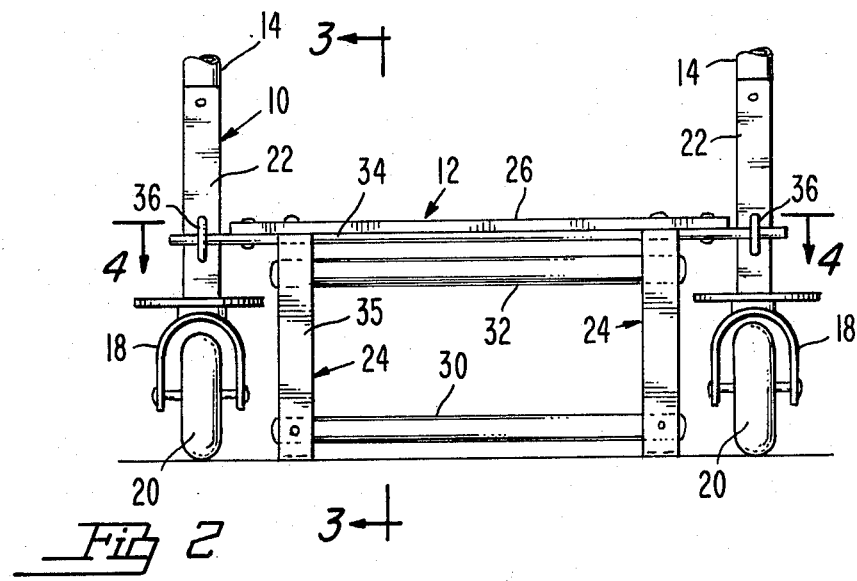
FIG. 2 is an enlarged, fragmentary rear elevational view of the step attachment and cart, as seen from the line 2—2 of FIG. 1, the step attachment being shown in its lowered, operative position.
Figure 3:
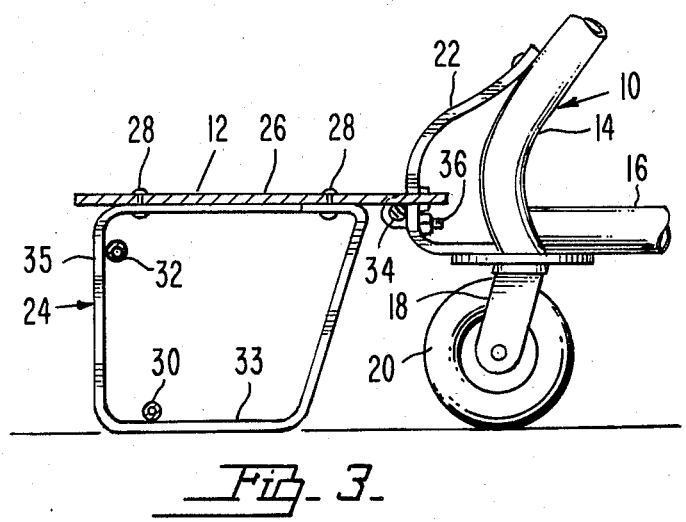
FIG. 3 is a transverse sectional view on the same scale as FIG. 2, taken substantially on line 3—3 of FIG. 2.

Whether the frame elements 24 be endless loops or U shaped pieces, in every instance said frame elements are riveted, bolted or otherwise fixedly secured to the underside of the flat, rectangular platform 26, in transversely spaced relation as shown in particular advantage in FIG. 2. For this purpose rivets 28 or equivalent fasteners can be used.

The frame elements 24 are reinforced through the provision of transversely extending, tubular reinforcing bars or braces 30, 32. Brace 30 can extend between the horizontal bottom or tread portions 33 of the respective frame members 24, while the reinforcing bar 32 can be secured to and extended between the upper portions of the rear, vertically disposed legs 35 of the frame elements 24.

Riveted or otherwise fixedly secured to the underside of the platform 26, adjacent the forward edge thereof, is a pivot bar 34, the ends of which project beyond the respective side edges of the platform 26 as best shown in FIG. 2 so as to extend across the rear bumpers 22 of the grocery cart, rearwardly of said bumpers. Then, U shaped clevises or connecting yokes 36 receive the projecting end portions of the pivot bar 34, and are set in through openings that are formed in the bumpers 22. These openings receive the legs of the connecting yokes, and in accordance with the invention, the distal ends of the legs are threaded to receive nuts or the like, to connect the pivot bar 34 to the rear bumpers 22 of the cart.

The connection is left just loose enough to permit the pivot bar to rotate, so that the entire device can be pivotally swung on the rear bumpers 22 of the grocery cart between the use position shown in full lines in FIG. 1 and an upper, retracted position thereof shown in dotted lines in the same figure of the drawing.

Since the entire device, with the exception of the pivot bar 34, occupies a space less than the transverse distance between the side frame members 14 of the cart, the device can be swung upwardly and out of the way to the dotted line position shown in FIG. 1 merely by grasping the platform and lifting it until it passes over the hinge axis defined by the bar 34, after which it will swing under its own weight to the fully retracted, dotted line position shown in FIG. 1.

It will be seen that the grocery shopping cart is not modified in any way. In order to receive the step attachment, all that is necessary is that holes be drilled in the bumpers 22 to receive the connecting yokes 36.

In use of the device, it would normally be in the retracted, dotted line position shown in FIG. 1. The person using the shopping cart may, ultimately, arrive at a location where it becomes necessary to reach for a product on an upper shelf. To eliminate the need for one's stretching uncomfortably to reach the product, one need only swing the step attachment from the dotted line position shown in FIG. 1 to the full line position. This disposes the step attachment in a position in which the platform is elevated above the floor surface, and is projected rearwardly from the shopping cart, so that the user can now stand on the platform and reach the desired product without difficulty.

At the same time, the tread portions 33 of the frame elements 24 are disposed in frictional engagement with the floor surface, and under the weight of the user grip the floor surface in such a way as to provide a stable support for the platform. At the same time, the device, with the weight of the user supported thereon, acts as a brake to keep the shopping cart from moving.

Thereafter, after use has been made of the platform, the user need merely swing the platform back to its retracted position, in which it is recessed in the space below the basket of the cart, between the side frame members 14. The basket provides clearance for the forward swinging movement of the device to its retracted position, and movement beyond the retracted position is limited by engagement of the platform against the side frame members 16 of the cart, which as seen in FIG. 4 converge in a forward direction to provide an abutment engaging the platform when it is swung forwardly to the inoperative position thereof shown in dotted lines in FIG. 1.

In this position, the device does not interfere with nesting of one cart into another in the manner shown in FIG. 1.

In FIG. 5, there is shown a modified form of the device designated 12a which essentially is similar in construction and use to the first form of the invention. In this case, the device is shown attached to a different type of grocery cart 10a, having upwardly extending rear frame members 14a, and bottom rails 16a. In this case there is no bumper 22, and the device is simply pivotally connected to the cart by means of a U shaped connector 36a which pivotally joins the projecting ends of pivot bar 34a directly to the frame members 14a of the cart. In use and operation the device of FIG. 5 is identical to that disclosed in FIGS. 1-4.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. The combination, with a grocery shopping cart of the type having a forward portion adapted to be nested within a like, preceding shopping cart and having a rear portion that projects rearwardly from said preceding cart in the nested relation of the carts, said cart including a basket the forward portion of which is adapted to enter the basket of the like, preceding cart, rear side frame members on the rear portion of said cart, said rear side frame members being transversely spaced to define a space in the rear portion of the cart below the portion of the basket not entering the basket of the preceding cart, and horizontal bottom rails converging forwardly from the rear side frame members and adapted to enter the space defined between the rear side frame members of said like, preceding cart, of a step comprising:

(a) a platform;
(b) a pivot bar secured to the platform and having ends projecting beyond opposite sides of the platform;
(c) means for connecting the projecting ends of the pivot bar to the rear side frame members of the cart, whereby to mount the step for swinging movement between a first, use position in which it projects rearwardly from the rear side frame members for the convenience of a user, and a second, recessed position in which it is swung forwardly into said space a distance less than the extent of the rearward projection of the rear portion of the cart when the same is nested within the preceding cart, said step, in its recessed position, being spaced rearwardly from a similarly recessed step of the preceding cart in the nested relation of the carts sufficiently to prevent the recessed step of said cart from contacting either the preceding cart or the recessed step thereof in such manner as would interfere with the nesting of the carts, said forwardly converging bottom rails providing abutment means limiting the forward swinging movement of the platform beyond the second named position thereof; and
(d) frame elements secured to the platform and adapted to support the platform, when the platform is in its first named position above the floor surface upon which the cart is rollably supported, said frame elements being in the form of metal loops having tread portions that bear frictionally against the floor surface under the weight of the user when the platform is in use as a convenience step, whereby to provide means braking the shopping cart against movement during use of the convenience step.

* * * * *